United States Patent
Ray et al.

(10) Patent No.: US 7,692,138 B1
(45) Date of Patent: Apr. 6, 2010

(54) INTEGRATED SCANNING PROBE MICROSCOPE AND CONFOCAL MICROSCOPE

(76) Inventors: David James Ray, 28723 Colina Vista, Agoura Hills, CA (US) 91301; Nicholas Gregory Doe, 202 Gaucho Ct., San Ramon, CA (US) 94583; Terence Rogers Lundy, 200 Elm Rd., Bolinas, CA (US) 94924

(*) Notice: Subject to any disclaimer, the term of this patent is extended or adjusted under 35 U.S.C. 154(b) by 0 days.

(21) Appl. No.: 11/975,548

(22) Filed: Oct. 19, 2007

Related U.S. Application Data (60) Provisional application No. 60/854,035, filed on Oct. 23, 2006.

(51) Int. Cl.
*G01B 5/28* (2006.01)
(52) U.S. Cl. .................. 250/234; 250/216; 250/235
(58) Field of Classification Search ............. 250/234, 250/306, 216, 235, 307, 310; 73/105
See application file for complete search history.

(56) References Cited

U.S. PATENT DOCUMENTS

| | | | |
|---|---|---|---|
| 4,726,685 A * | 2/1988 | Kobayashi et al. ........... 356/445 |
| 5,298,975 A | 3/1994 | Khoury et al. |
| 5,581,082 A * | 12/1996 | Hansma et al. ............. 250/306 |
| 5,581,345 A | 12/1996 | Oki et al. |
| 5,825,020 A | 10/1998 | Hansma et al. |
| 5,859,364 A * | 1/1999 | Toda et al. .................... 73/105 |
| 5,861,550 A | 1/1999 | Ray |
| 5,861,624 A | 1/1999 | Alexander et al. |
| 5,874,669 A | 2/1999 | Ray |
| 5,952,657 A | 9/1999 | Alexander et al. |
| 6,138,503 A | 10/2000 | Ray |
| 6,189,373 B1 | 2/2001 | Ray |
| 6,415,654 B1 | 7/2002 | Ray |
| 6,515,277 B1 | 2/2003 | Kley |
| 6,649,902 B2 | 11/2003 | Schaffer et al. |
| 6,748,794 B2 | 6/2004 | Ray |
| 6,844,935 B2 | 1/2005 | Lee et al. |
| 6,910,368 B2 | 6/2005 | Ray |
| 6,986,280 B2 | 1/2006 | Muckenhirm |
| 7,045,780 B2 | 5/2006 | Kley |
| 7,047,796 B2 | 5/2006 | Lewis et al. |
| 7,091,476 B2 | 8/2006 | Kley |
| 7,109,482 B2 | 9/2006 | Kley |
| 7,170,048 B2 | 1/2007 | Kakemizu |
| 2005/0117163 A1 * | 6/2005 | Ng et al. ..................... 356/501 |
| 2007/0180889 A1 * | 8/2007 | Murayama et al. ........... 73/1.79 |

* cited by examiner

*Primary Examiner*—Georgia Y Epps
*Assistant Examiner*—Tony Ko
(74) *Attorney, Agent, or Firm*—Sandy Lipkin (57) ABSTRACT

A combination confocal and scanning probe microscope system permits accurate location of a sample within the field of view as the sample translates from one type of microscope to the other. Alternate embodiments permit both microscopes to view the same sample location at the same time. Further alternate embodiments include a confocal and a probe microscope integrated into a common optical path.

8 Claims, 7 Drawing Sheets

FIG. 6

INTEGRATED SCANNING PROBE MICROSCOPE AND CONFOCAL MICROSCOPE

REFERENCE TO PRIOR APPLICATION

This application claims the priority of provisional application 60/854,035, filed Oct. 23, 2006 entitled INTEGRATED SCANNING PROBE MICROSCOPE AND CONFOCAL MICROSCOPE by David James Ray, Nicholas Gregory Doe and Terence Rogers Lundy.

BACKGROUND OF THE INVENTION

1. Field of the Invention

The present invention relates generally to a scanning probe microscope in combination with a confocal microscope and method for operating the resulting combination microscope. This invention more specifically relates to the use of a confocal microscope for detecting features in a wider field of view than that of the probe of the scanning probe microscope and then employing the probe microscope to examine the detail of features identified by the confocal microscope. The present invention also relates to the field of scanning probe microscopes, including probe microscopes that use either interference of light beam detection schemes or reflected beam position detectors.

2. Description of the Prior Art

The following U.S. Patents are incorporated by reference in their entirety for all purposes:

U.S. Pat. No. 5,861,550, issued 19 Jan. 1999, to David J. Ray for SCANNING FORCE MICROSCOPE U.S. Pat. No. 5,874,669, issued 23 Feb. 1999, to David J. Ray for SCANNING FORCE MICROSCOPE WITH REMOVABLE PROBE ILLUMINATOR ASSEMBLY U.S. Pat. No. 6,138,503, issued 31 Oct. 2000, to David J. Ray for SCANNING PROBE MICROSCOPE SYSTEM INCLUDING REMOVABLE PROBE SENSOR ASSEMBLY U.S. Pat. No. 6,189,373, issued 20 Feb. 2001, to David J. Ray for SCANNING FORCE MICROSCOPE AND METHOD FOR BEAM DETECTION AND ALIGNMENT U.S. Pat. No. 6,415,654, issued 9 Jul. 2002, to David J. Ray for SCANNING PROBE MICROSCOPE SYSTEM INCLUDING REMOVABLE PROBE SENSOR ASSEMBLY U.S. Pat. No. 6,748,794, issued 15 Jun. 2004, to David James Ray for METHOD FOR REPLACING A PROBE SENSOR ASSEMBLY ON A SCANNING PROBE MICROSCOPE U.S. Pat. No. 6,910,368, issued 28 Jun. 2005, to David J. Ray for REMOVABLE PROBE SENSOR ASSEMBLY AND SCANNING PROBE MICROSCOPE U.S. Pat. Nos. 6,189,373, 6,415,654, 6,748,794, and 6,910,368 to Ray Probe microscopes belong to a family of microscopes that use a small probe to detect and measure features in micrometer, nanometer and sub nanometer dimensions. Confocal microscopes, on the other hand, use apertures or a tightly focused laser beam in combination with an aperture or apertures for observing a sample surface. The present invention uses the advantages of each of these microscopes to obtain results that neither can individually obtain.

One type of probe microscope uses a light beam, often created by a laser, wherein the beam is directed at a reflecting surface on the free end of a cantilever. The cantilever surface opposing the reflecting surface includes a probe tip that senses some parameter of the sample surface. The combination of cantilever and probe are often referred to as a probe assembly. If the probe tip experiences a force, then the cantilever will bend or deflect. The deflection may be either toward the sample surface, if the force is attractive, or away from the surface, if the force is repulsive. The deflection may be measured by the beam of light is reflected from the reflecting surface of the cantilever. The position of the reflected beam may be determined by interposing an array of photo-detectors in the path of the reflected beam. Alternately the deflection of the cantilever may be detected by an interference detector that compares the light phase of the reflected beam with the light phase of the original beam. A probe microscope that exploits the phenomenon of a force exerted on the probe tip as a result of tip's proximity to another body is commonly known as a Scanning Force Microscope. In practice as the tip is moved in the X,Y plane the tip encounters different sample surface elevations. A computer is then used to display the cantilever deflection angle, or the positioning signal required to restore the cantilever to a specified deflection angle, as a function of the probe tip X, Y position. Using graphic techniques an image of the sample surface is recreated on the computer display.

If the forces detected are the inter-atomic forces between the atoms on the sample surface and the atoms of the probe tip then the probe tip is typically shaped like and acts in the fashion of a stylus as it is moved over the sample surface. A microscope that uses this phenomenon is typically referred to as an Atomic Force Microscope.

When used to image the topography of a sample, the scanning force microscope uses the finely pointed stylus to interact with a sample surface. Scanning force microscopes are typically used to measure the three dimensional topography of a sample surface. A scanning mechanism in the microscope creates relative motion between the stylus and the sample surface. Other classes of probe microscopes may use different types of probes to measure sample features other than topography. For example, the interaction of a magnetic probe with the sample may create an image of the magnetic domains of the sample. Scanning tunneling microscopes use a conductor with a sharp point and a small bias voltage to sense a sample surface which is then used to form an image of charge density.

Confocal microscopes operate by bringing, substantially, a point source of light to focus on a sample surface. An image of the point of light on the surface is then brought to focus at or near an aperture. The light then continues through the aperture on a path to a photo-detector that measures the intensity of the light. If the image of the approximate point source is in focus at the aperture, the aperture passes substantially all the light and the detector output is maximized. If the image is not in focus at the aperture the aperture vignettes a portion of the light and the detector output is less than if the aperture were located directly at the focus point of the light.

In modern confocal microscopes a disc containing a sequence of apertures may be used. By moving or rotating the disc, one aperture in the sequence passes light from a point on a specific location of the sample to the detector. When the disc is rotated the next aperture in the sequence of apertures passes light from different location on the sample to the detector. If the focus point of the light on the sample is above or below the actual surface of the sample then the detector will measure slightly less light passing through the aperture. The detector output at each aperture in the sequence can be processed by computer to create a data set that represents the relative intensity of the points on the sample. By changing the focus point of the light on the surface relative to the disc containing the apertures or by moving the disc to a slightly different Z position different planes of in focus light will be created at the apertures and a different set of surface data will result. The different data sets will essentially show all sample points that intersect the focus plane of any particular aperture as having greater intensity than sample points not in the focal plane of that aperture. A computer may be used to process the data sets to display a three dimensional image on the computer display device. The light source may be either a focused point source of white light or a focused source of laser or coherent light.

Each of these microscope types (confocal and probe) have advantages and disadvantages. Confocal microscopes can create images with very high resolution in the Z axis but typically have limited resolution in the X and Y axes to that of normal optical microscopes. Typically confocal microscopes have wider fields of view than probe microscopes. Probe microscopes on the other hand have greater resolution in the X, Y, and Z axes, but have fields of view that are restricted by the speed of the scan and the range of the scanning mechanisms.

U.S. Pat. Nos. 7,030,369, 6,339,217 and 6,515,277 to Kley address some aspects of the deficiencies of confocal and probe microscopes by describing an invention that directs light through a transparent probe or a portion of a transparent probe. In this case the light is recovered by a photo detector back through the probe. While this approach improves on the current art it does not completely solve the problems of scan speed and field of view. The apparatus described by Kley uses an X,Y translator to move the sample. As a consequence large samples pose technical problems in the form of the size and force that must be employed by the Kley sample translator in moving large samples at speeds that will result in acceptable scan times.

U.S. Pat. No. 5,581,082 to Hansma et. al. also describes an apparatus for combining a confocal and a probe microscope. Here again the sample moves while the scanning probe microscope and the confocal apparatus remain fixed in space. The same deficiencies as in the Kley patents are inherent in the Hansma et. al. microscope.

The present invention overcomes the deficiencies of the individual confocal and probe microscopes and leverages the advantages of both.

SUMMARY OF THE INVENTION

The present invention, in one embodiment, combines a base, two bridges, and a coarse X,Y sample translator to permit a sample to be rapidly moved and scanned by a confocal and a probe microscope. The sample is translated in coarse motion from the confocal microscope to the scanning probe microscope and vice versa.

In another embodiment a probe microscope is positioned coaxially with the optical train of the confocal microscope.

In still another embodiment the optics and detection mechanisms of the probe microscope are integrated into the optical train of the confocal microscope.

In each of the embodiments it should be understood that the confocal microscope may be either white light or laser light driven and that the confocal microscope may work with either dark field or bright field illumination.

One advantage of the current invention in its various forms is that scan times may be reduced dramatically over the time required by prior art microscopes.

As defined by this specification, the present invention teaches in its first embodiment a combination microscope system for scanning the surface of a sample that combines a probe microscope and a confocal microscope comprising a base; an X, Y stage attached to the base that carries the sample; a first bridge attached to the base carrying a first Z axis stage that carries the probe microscope; and a second bridge attached to the base carrying a second Z axis stage that carries the confocal microscope.

The above embodiment can be further modified by defining that one or more computers send commands to and/or receives data from the confocal microscope and the probe microscope and that processes the data and presents one or more images to one or more users through one or more display devices as commands to the first Z axis, the second Z axis and the X, Y stage.

The above embodiment can be further modified by defining that the commands by the computer in response to the data includes commanding the location of the sample anomalies or features of interest to be viewed by the probe microscope.

The above embodiment can be further modified by defining that the first bridge attached to the base carrying a first Z axis stage that carries the probe microscope; and the second bridge attached to the base carrying a second Z axis stage that carries the confocal microscope are positioned to allow the probe microscope and the confocal microscope to be positioned adjacent to each other.

The above embodiment can be further modified by defining that a probe module cassette is attached to the stage wherein the cassette contains one or more probe modules wherein when the X,Y stage positions the cassette under the probe microscope, the Z stage then lowers the probe microscope to engage one of the probe modules and then the Z stage raises the probe microscope while the X,Y stage moves the sample to the correct location such that the imaging and scanning sequence may resume with the fresh probe module.

A second embodiment of the instant invention teaches a combination microscope system for scanning the surface of a sample that combines a probe microscope and a confocal microscope comprising: a detector assembly attached to the confocal microscope; an objective lens attached to the detector assembly; a first alternate probe microscope; a probe microscope frame positioned near but not touching the objective lens, the probe microscope further comprising a probe module; an X,Y translator that creates relative X,Y motion between the frame and the probe module; wherein the probe module carries a light source that creates a light beam directed toward a cantilever, the reflection of the light beam then being directed through a detector lens and then onto a photo detector and wherein the cantilever is connected to the probe assembly, the probe assembly being then connected to a Z motion means, the Z motion means creating relative motion between the probe assembly and the sample surface to be scanned; and wherein the Z motion device moves the probe module toward and away from the sample surface to be scanned and wherein the X,Y translator moves the sample in an X and Y plane substantially parallel to the sample surface wherein when the tip of the probe assembly senses the proximity of the surface of the sample and the cantilever deflects the reflection of the light beam moves vertically and/or horizontally on a photodiode array.

The above embodiment can be further modified by defining that one or more computers send commands to and/or receives data from the confocal microscope and the probe microscope and that processes the data and presents one or more images to one or more users through one or more display devices as commands to the first Z axis, the second Z axis and the X, Y stage.

The above embodiment can be further modified by defining that the commands by the computer in response to the data includes commanding the location of the sample anomalies or features of interest to be viewed by the probe microscope.

The above embodiment can be further modified by defining that a probe module cassette is attached to the stage wherein the cassette contains one or more probe modules wherein when the X,Y stage positions the cassette under the probe microscope, the Z stage then lowers the probe microscope to engage one of the probe modules and then the Z stage raises the probe microscope while the X,Y stage moves the sample to the correct location such that the imaging and scanning sequence may resume with the fresh probe module.

A third embodiment of the instant invention teaches a combination microscope system for observing a parameter of a sample, the system comprising a confocal microscope; a probe microscope, the probe microscope further comprising an objective lens; a probe module; and means for laterally translating the probe module over the sample wherein the probe module further comprises a light source for creating an incident light beam; a lens for focusing the light beam; means for redirecting the incident light beam onto a cantilever wherein the light beam is at least partially reflected from the cantilever; a probe assembly, the probe assembly further comprising: a stylus for sensing a parameter of the sample wherein the cantilever is responsive to forces exerted on the stylus by the parameter of the sample and wherein the module further comprises means for moving the probe assembly toward and away from the sample; means for redirecting the reflected light beam onto detections means wherein the detection means detects a parameter of the reflected light beam; and wherein the probe module is mounted adjacent to the objective lens to permit the confocal microscope to observe the sample and a portion of the probe assembly.

The above embodiment can be further modified by defining that the light source is a laser.

The above embodiment can be further modified by defining that the detector detects the changing position of the reflected light beam where the changing position results from deflections of the cantilever.

The above embodiment can be further modified by defining that the detector detects interference changes resulting from the incident and the reflected light beam.

A fourth embodiment of the instant invention teaches a combination microscope system for observing a parameter of a sample comprising a probe microscope wherein the probe microscope further comprises: first means for laterally translating a probe assembly over the sample; a probe assembly responsive to a parameter of the sample; second means for generating an incident light beam; and a confocal microscope wherein the confocal microscope further comprises an objective lens; third means for receiving the incident light beam wherein the third means directs the received incident light beam through the objective lens and onto the probe assembly and wherein the probe assembly reflects at least a portion of the incident light beam back through the objective lens and the third means further directs the portion of reflected light beam back to the probe microscope; wherein the probe microscope detects changes in a parameter of the reflected light beam due to the probe assembly responding to the parameter of the sample as the probe assembly moves over the sample.

The above embodiment can be further modified by defining that the third means comprises at least one element selected from the group consisting of lenses, mirrors, and prisms.

The above embodiment can be further modified by defining that the second means for generating light is a laser.

The above embodiment can be further modified by defining that the detected parameter of the reflected light is the position of the reflected light.

The above embodiment can be further modified by defining that the detected parameter of the reflected light is the resulting interference of the reflected light with the incident beam.

A fifth embodiment of the instant invention teaches a microscope system for observing a sample comprising a confocal microscope; a probe microscope module, the probe microscope module further comprising an objective lens for focusing an image onto the confocal microscope; a light source for creating an incident beam of light; a probe assembly for detecting a parameter of the sample; a detector for detecting a parameter of an at least partially reflected beam of light from the probe assembly; means for moving the probe assembly substantially toward and away from the sample; wherein the system further comprises means for translating the microscope module laterally over the sample.

The above embodiment can be further modified by defining that the light source is a laser.

The above embodiment can be further modified by defining that the detector compares the reflected light beam with the incident beam of light to produce a signal representative of the interference of the incident and the reflected light beams.

The above embodiment can be further modified by defining that the light source is a laser.

The above embodiment can be further modified by defining that the light source is a laser.

DETAILED DESCRIPTION OF A PREFERRED EMBODIMENT

Turning to the drawings, the preferred embodiment is illustrated and described by reference characters that denote similar elements throughout the several views of the instant invention.

Figure 1A:
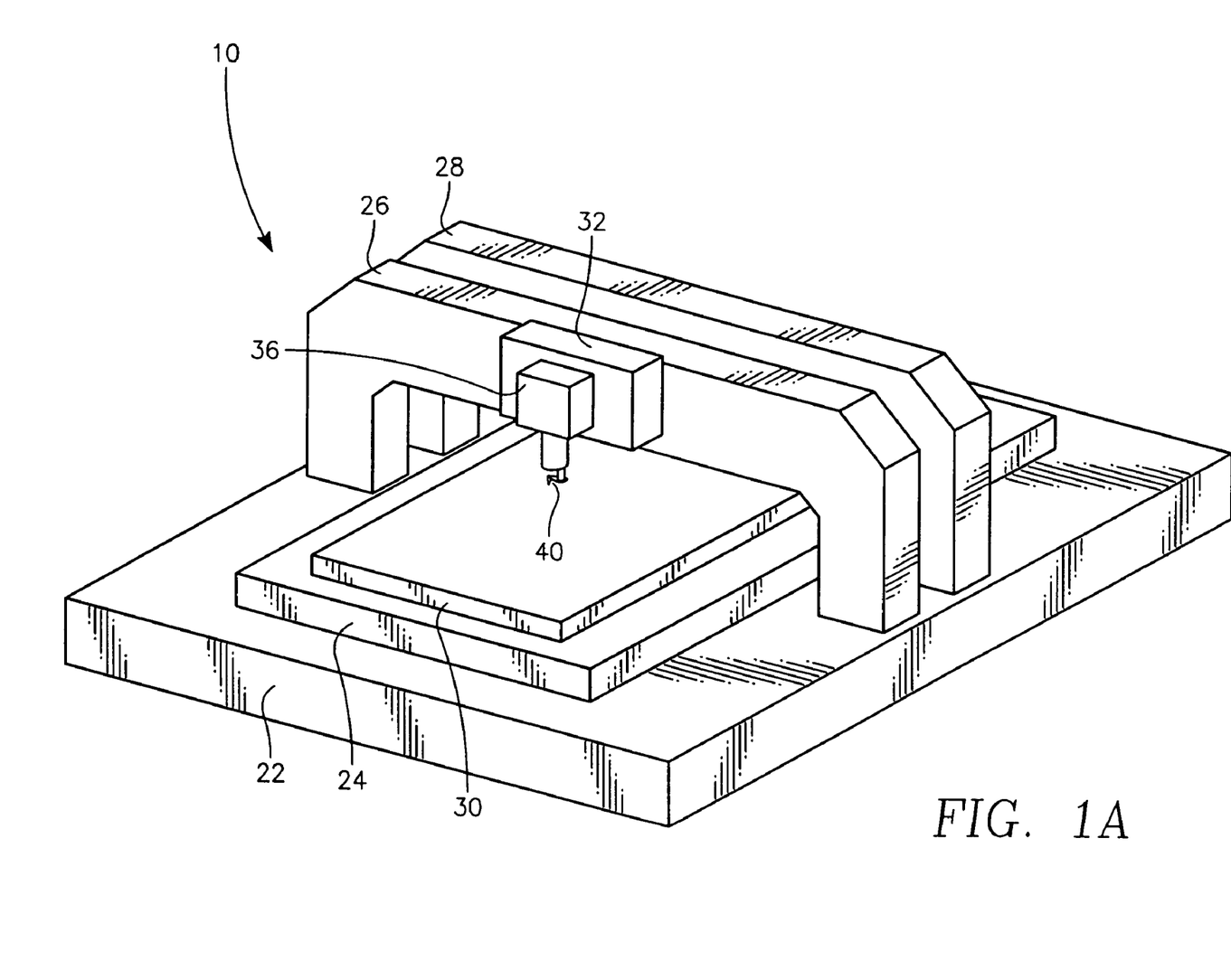
FIG. 1A is a perspective view of a juxtaposed confocal and probe microscope assembly showing a double bridge support structure.

FIG. 1A is a perspective view of a first embodiment of the invention. Combined microscope system 10 has a base 22 that is typically made of precision finished granite. Granite is preferred because it can be cut and surface ground to a high degree of flatness and smoothness although other stable precision shaped material such as certain glasses like Zerodur available from Schott Glass Technologies or ceramics may also be used. A long range X, Y stage 24 is affixed to granite base 22. A sample 30 to be observed and measured is carried by stage 24. In this embodiment a first bridge 26 carries a long range Z axis stage 32 that in turn carries a scanning probe microscope 36. Second bridge 28 is visible in this view and will presently be described in greater detail.

Figure 1B:
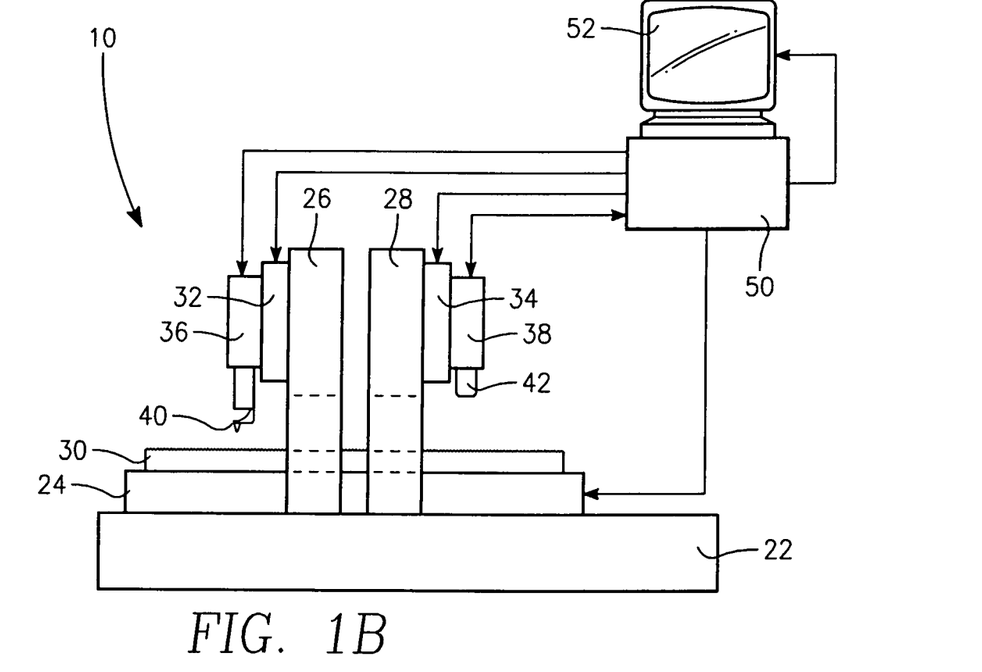
FIG. 1B is a side view of a juxtaposed confocal and probe microscope assembly constructed in a first embodiment.

FIG. 1B shows the first embodiment in a side view. In this view of microscope system 10, second bridge 28 is shown as a support for a second large range Z axis stage 34. Stage 34 in turn supports a confocal microscope 38. A computer 50 sends commands to, and receives data from, confocal microscope 38, and probe microscope 36. Computer 50 also processes data and presents image data to a user either a through display device 52 or to a second computer and display (not shown) via networking cables (not shown). Computer 50 also sends commands to long range Z axis stages 32 and 34 as well as sending commands to long range X, Y stage 24. Objective lens 42 is attached to confocal microscope 38.

In operation the combined microscope system 10 allows the sample to be located below confocal microscope 38 for observation. Confocal microscope 38 and associated objective lens 42 have a wide field of view compared to probe microscope 36. Microscope 38 also has high resolution in the Z axis. By analyzing the image data computer 50 may display large field of view image data which shows possible anomalies or surface features of interest in sample 30 but in which the shape of the feature in X, Y is unclear due to the limited X, Y resolution produced by confocal microscope 38. Computer 50 will, however, report the X, Y location of the suspected anomaly or feature and is programmed to move the suspected anomaly or feature into the field of view of probe microscope 36. Probe microscope 36 may then be commanded by computer 50 to scan the suspected anomaly with the smallest scan range known to capture the anomaly since stage 24 is extremely accurate and repeatable in its motion. Computer 50 may then make comparisons of the data from either or both microscopes and logically decide on a course of further action or inaction.

Bridges 26 and 28 are only coupled through base 22 but otherwise do not touch each other. In this configuration vibration from confocal microscope 38 and Z axis stage 34 are only minimally coupled to probe microscope 36. Probe microscopes in general are sensitive to vibration.

Further, by using pattern recognition, computing device 50 may recognize patterns that have areas of critical X, Y and Z features and that should be scanned by probe microscope 36 for anomalies or critical dimensions. Notable in the design of microscope system 10 is the fact that the SPM bridge 26 is very stable since, in the lateral direction, it is only large enough to accommodate stage 24 but is open to samples that can be much longer. This is to say that the sample 30 is only limited in one dimension and, in practice may be very long.

Figure 1C:
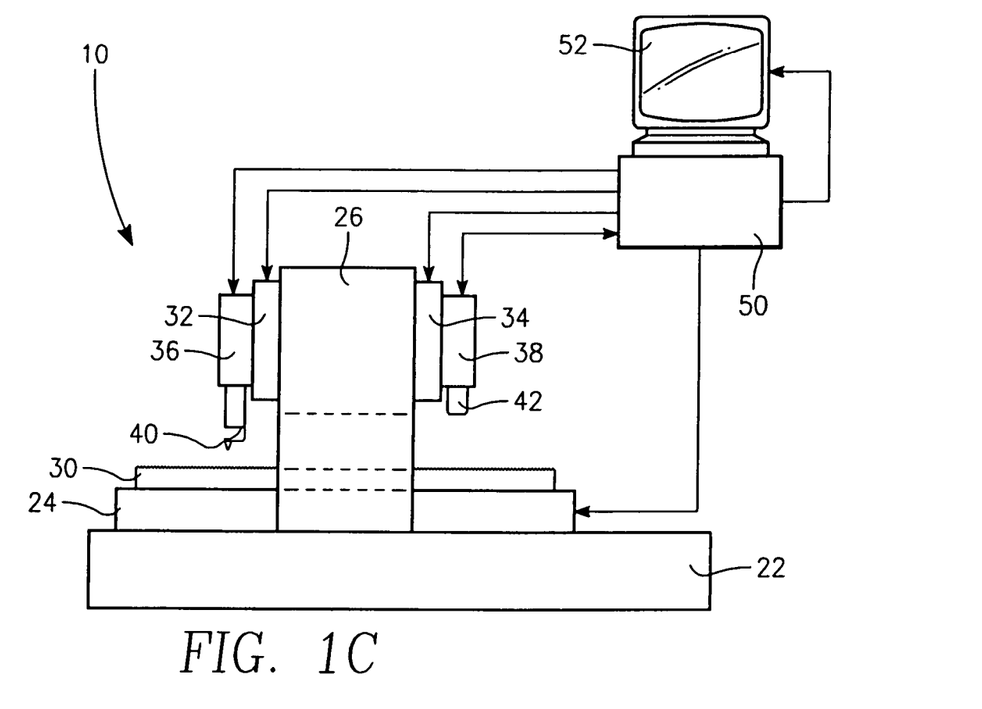
FIG. 1C is a side view of a single bridge version showing a probe microscope on one side and a confocal microscope on the opposing side of the bridge.

FIG. 1C shows a second embodiment in a side view. This is a view of a single bridge combined scanning probe and confocal microscope system 20.

A bridge 26 is shown as a support for first and second large range Z axis stages 32 and 34. Stage 32 supports probe microscope 36 and stage 34 supports confocal microscope 38. Computer 50 sends commands to, and receives data from, confocal microscope 38, and probe microscope 36. Computer 50 also processes data and presents image data to the user either through display device 52 or to second computer and display (not shown) via networking cables (not shown). Computer 50 also sends commands to long range Z axis stages 32 and 34 as well as sending commands to long range X, Y stage 24. As in the first embodiment confocal microscope 38 has an objective lens 42.

In operation the combined microscope system 20 allows the sample to be located below confocal microscope 38 for observation. Confocal microscope 38 has a wide field of view compared to probe microscope 36. Microscope 38 also has high resolution in the Z axis. By analyzing the image data computer 50 may display large field of view image data which shows possible anomalies or surface features of interest in sample 30 but in which the shape of the feature in X, Y is unclear due to the limited X, Y resolution produced by confocal microscope 38. Computer 50 will, however, report the X, Y location of the suspected anomaly or feature and is programmed to move the suspected anomaly or feature into the field of view of probe microscope 36. Probe microscope 36 may then be commanded by computer 50 to scan the suspected anomaly with the smallest scan range known to capture the anomaly since stage 24 is extremely accurate and repeatable in its motion. Computer 50 may then make comparisons of the data from either or both microscopes and logically decide on a course of further action or inaction.

Figure 2A:
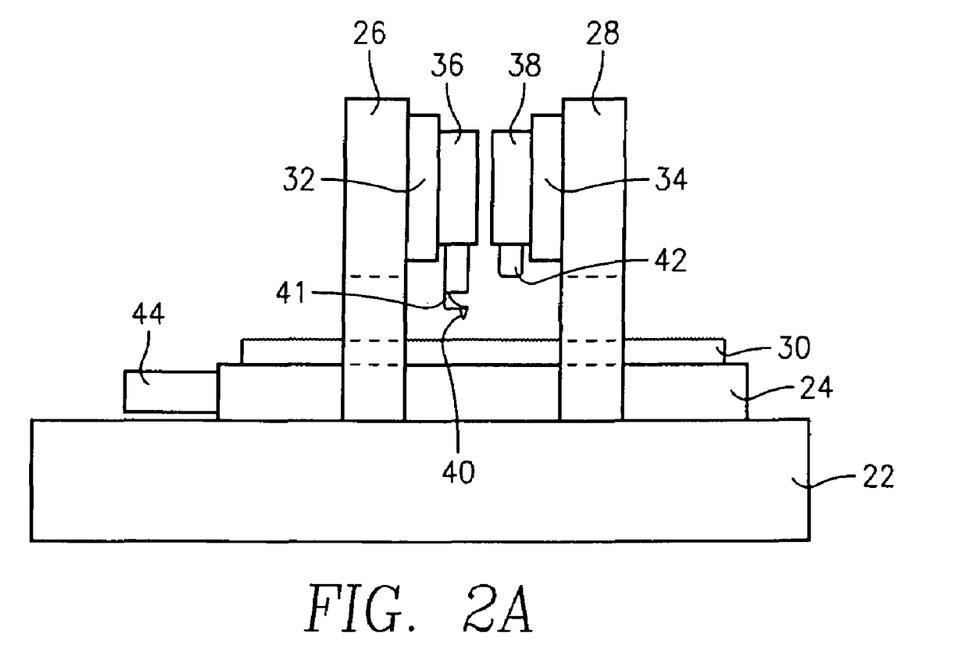
FIG. 2A is a side view of a juxtaposed confocal and probe microscope assembly constructed in a second embodiment with the inclusion of a probe module cassette.

FIG. 2A is a side view of a juxtaposed confocal and probe microscope assembly constructed in a second embodiment with the inclusion of a probe module cassette 44. In this embodiment bridges 26 and 28 have a greater separation than the first embodiment already described. However, by locating Z axis stages 32 and 34 and microscopes 36 and 38 such that they are positioned on the sides of bridges 26 and 28 that face each other, the distance between the objective lens 42 of confocal microscope 38 and a probe assembly 40 attached to probe module 41 that is further attached to probe microscope 36, is minimized. Now, when, in operation, stage 24 moves sample 30 from confocal microscope 38 field of view to probe microscope 36 field of view, stage 24 only moves a relatively small distance. X, Y stage 24 has minimum error in accuracy and repeatability when moving small distances in X and Y as opposed to large distances.

Figure 2B:
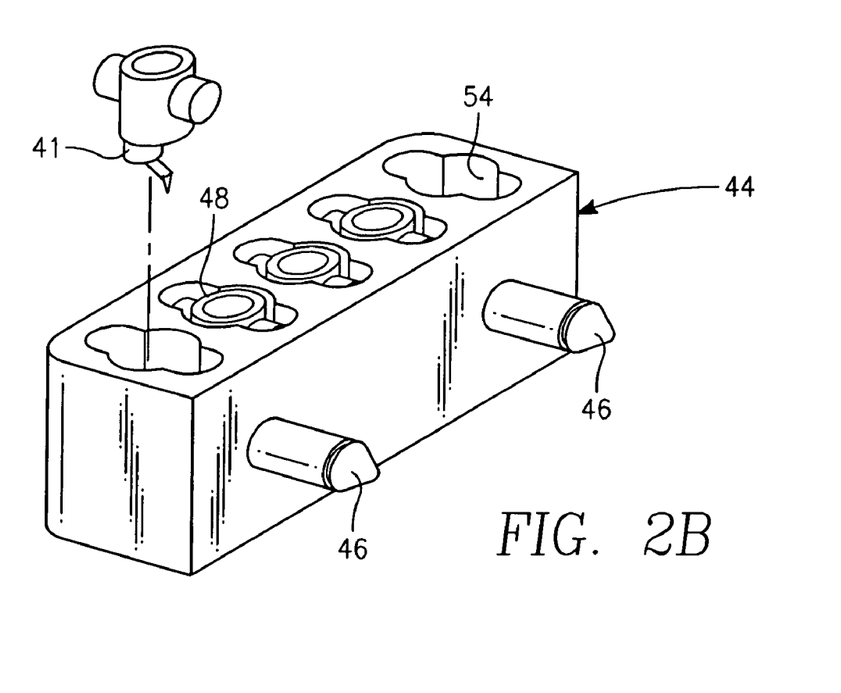
FIG. 2B shows a probe module cassette as would be used in combination confocal and probe microscope.

Referring to FIG. 2b, also present in the second embodiment is a probe module cassette 44 attached to stage 24 by means of retaining pins 46. Probe microscopes in general require that the probe assembly be changed on a periodic basis. As described in U.S. Pat. Nos. 5,874,669, 6,138,503, 6,189,373, 6,415,654, 6,748,794, and 6,910,368 to Ray, pre-aligned probe module 41 may be employed as a substitute for the tedious process of changing of the actual probe assembly. Probe module cassette 44 holds several fresh probe assemblies and may have at least one empty station 54 for receiving exhausted probe modules from probe microscope 36 shown in FIG. 2A. When probe assembly 40 requires changing, X, Y stage 24 positions empty cassette station 54 under probe microscope 36. Z stage 32 lowers probe microscope 36 such that probe module 41 is positioned in the empty cassette station 54 where module 41 is captured and removed from probe microscope 36. Z stage 32 then raises probe microscope 36. X, Y stage 24 then positions a new probe module 48 stored in cassette 44 under microscope 36. Z stage 32 then lowers to engage module 48 and module 48 is released from cassette 44. Z stage 32 raises microscope 36. X, Y stage 24 moves sample 30 the correct location such that the imaging and scanning sequence may resume with probe microscope 36 now fully functional.

Figure 3:
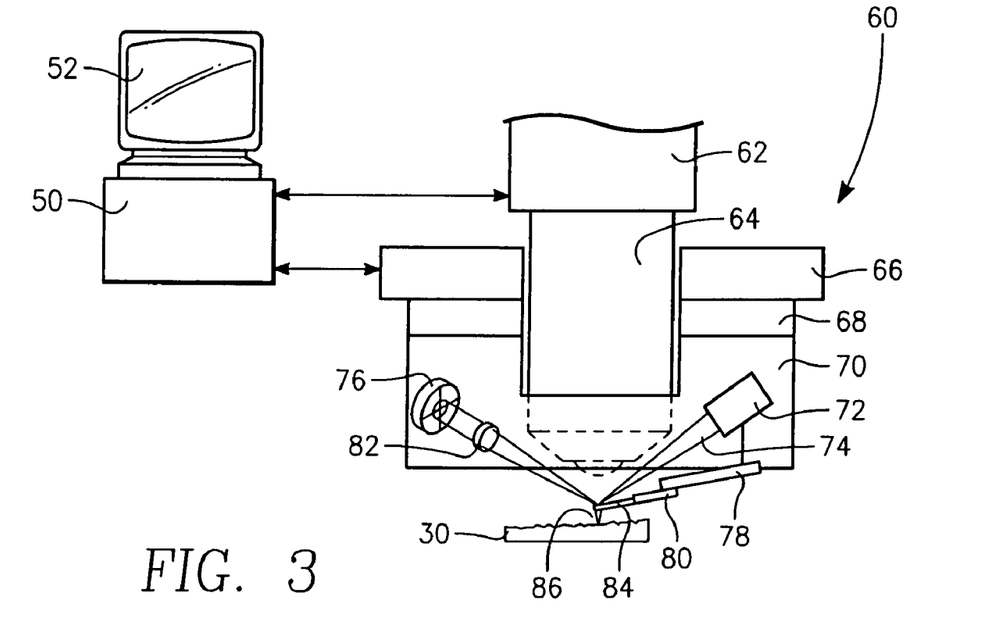
FIG. 3 shows a combined confocal and probe microscope integrated such that the probe microscope is located coaxially with the confocal microscope optical train.

FIG. 3 shows a third embodiment of the present invention. A combination confocal and probe microscope system 60 includes confocal microscope 38 comprising a detector assembly 62 and an objective lens 64 and a first alternate probe microscope 70. A probe microscope frame 66, shown in section view, is positioned near but not touching objective lens 64. Probe microscope 70 comprises an X, Y scanning translator 68, shown in section view, that creates relative X, Y motion between frame 66 and probe module 71. Such translator 68 may be a piezo driven flexure. Module 71 carries a light source 72 that is typically a laser or a diode laser. Light source 72 creates a light beam 74 directed toward a cantilever 84. The reflection of light beam 72 is then directed through a detector lens 82 and then onto a photo-diode array 76. Cantilever 84 is connected to probe assembly 80 that is in turn connected to Z motion device 78.

In operation X, Y flexure 68 moves first alternate probe microscope 70 in X, and Y plane substantially parallel to sample surface 30. Motion device 78 moves probe assembly 80 substantially toward and away from sample surface 30 in FIG. 2A. As a tip 86 senses the proximity of the surface of sample 30, cantilever 84 deflects and the reflection of light beam 74 will move vertically and possibly horizontally on photo-diode array 76. Since cantilever 80 is positioned at or near the optical axis of confocal microscope 38, confocal microscope 38 may observe and measure the surface of sample 30 at the same time and nearly at the same location as probe microscope 70. Computer 50 receives data from confocal microscope 38 and probe microscope 70. Computer 50 also sends command signals to confocal microscope 38 in FIG. 2A and probe microscope 70.

Probe microscope 70 may be easily removable from translator 68 in a manner described in U.S. Pat. Nos. 5,874,669, 6,138,503, 6,189,373, 6,415,654, 6,748,794, and 6,910,368 to Ray. Probe microscope 70 may also be automatically exchanged with a new probe module 48 that comprises a new probe assembly, not shown. This exchange process is as described above by placing microscope 70 over cassette 44.

Figure 4:
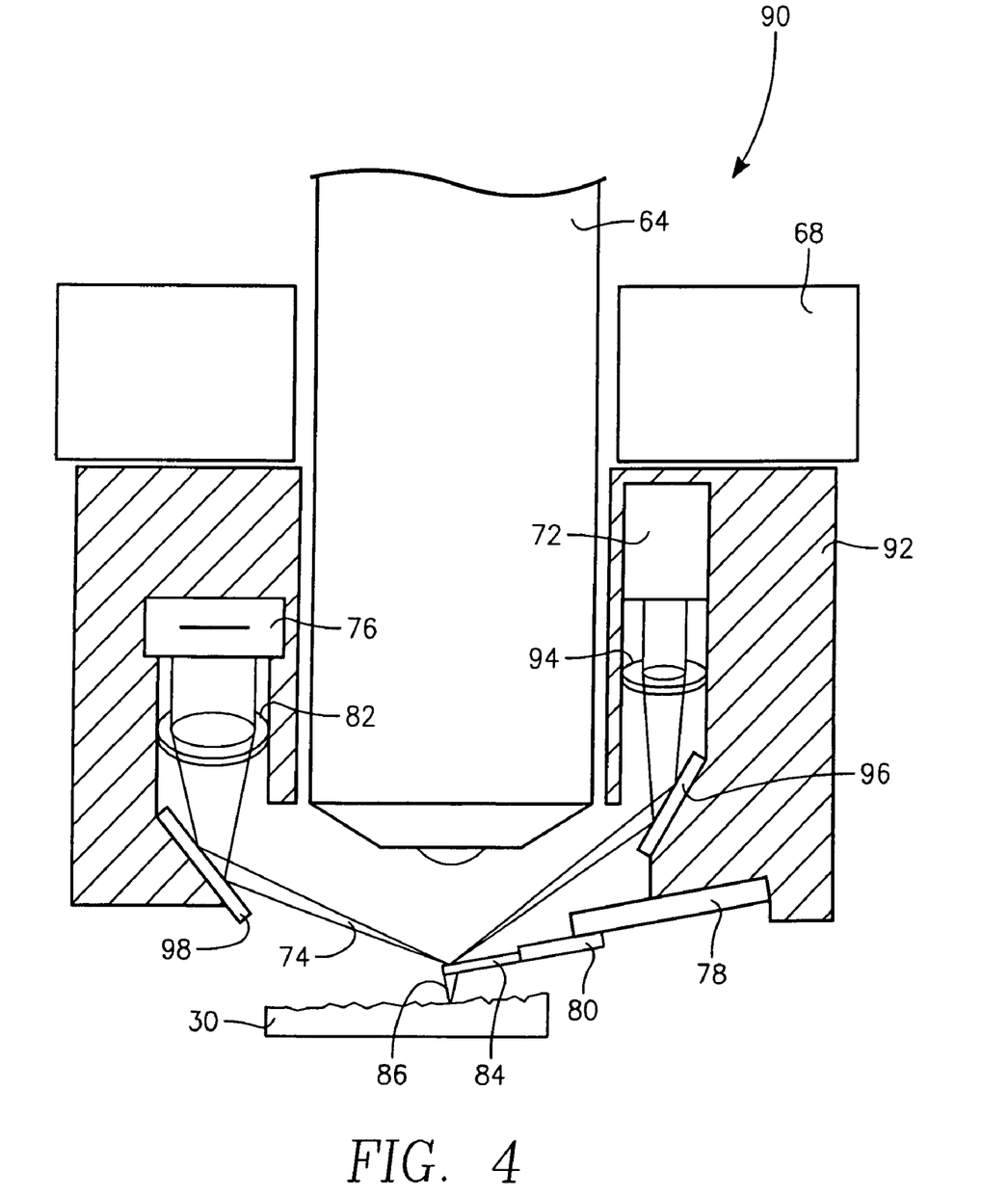
FIG. 4A shows a second embodiment of a combined confocal and probe microscope integrated such that the probe microscope is located coaxially or nearly coaxially with the confocal microscope optical train.

FIG. 4 shows a fourth embodiment of the present invention. In this embodiment a combined confocal and probe microscope system 90 employs an alternate probe module 92. Probe module 92 positions light source 72 such that light beam 74 reflects off a first mirror 96. Mirror 96 directs light beam 74 onto cantilever 84. At least a portion of light beam 74 reflects off cantilever 84 and is directed toward a second mirror 98 and from second mirror 98 through detector lens 82 and onto photo-diode array 76. Confocal objective lens 64 provides an image of sample 30 and confocal light beam (not shown) to a confocal microscope as described in previous embodiments. Also, as previously described, Z motion device 78 moves probe assembly 80 toward and away from sample 30 in response to feedback signals from computer 50. Flexure 68 moves module 92 substantially laterally over sample 30.

Probe module 92 may be easily removable from translator 68 in a manner described in U.S. Pat. Nos. 5,874,669, 6,138,503, 6,189,373, 6,415,654, 6,748,794, and 6,910,368 to Ray. Probe module 92 may also be automatically exchanged with a probe module with a new probe assembly as described in the second embodiment of the invention by placing module 92 cassette 44.

In operation this fourth embodiment operates similar to the third embodiment. As translator 68 moves module 92 in faster fashion over sample 30 probe tip 86 senses the surface of sample 30 and causes cantilever 84 to deflect resulting in a change in the path of the reflected portion of light beam 74 on its way toward second mirror 98 and further onto detector 76. Detector lens 82 is used to partially compensate for the divergence of the reflected portion of light beam 74.

Figure 5:
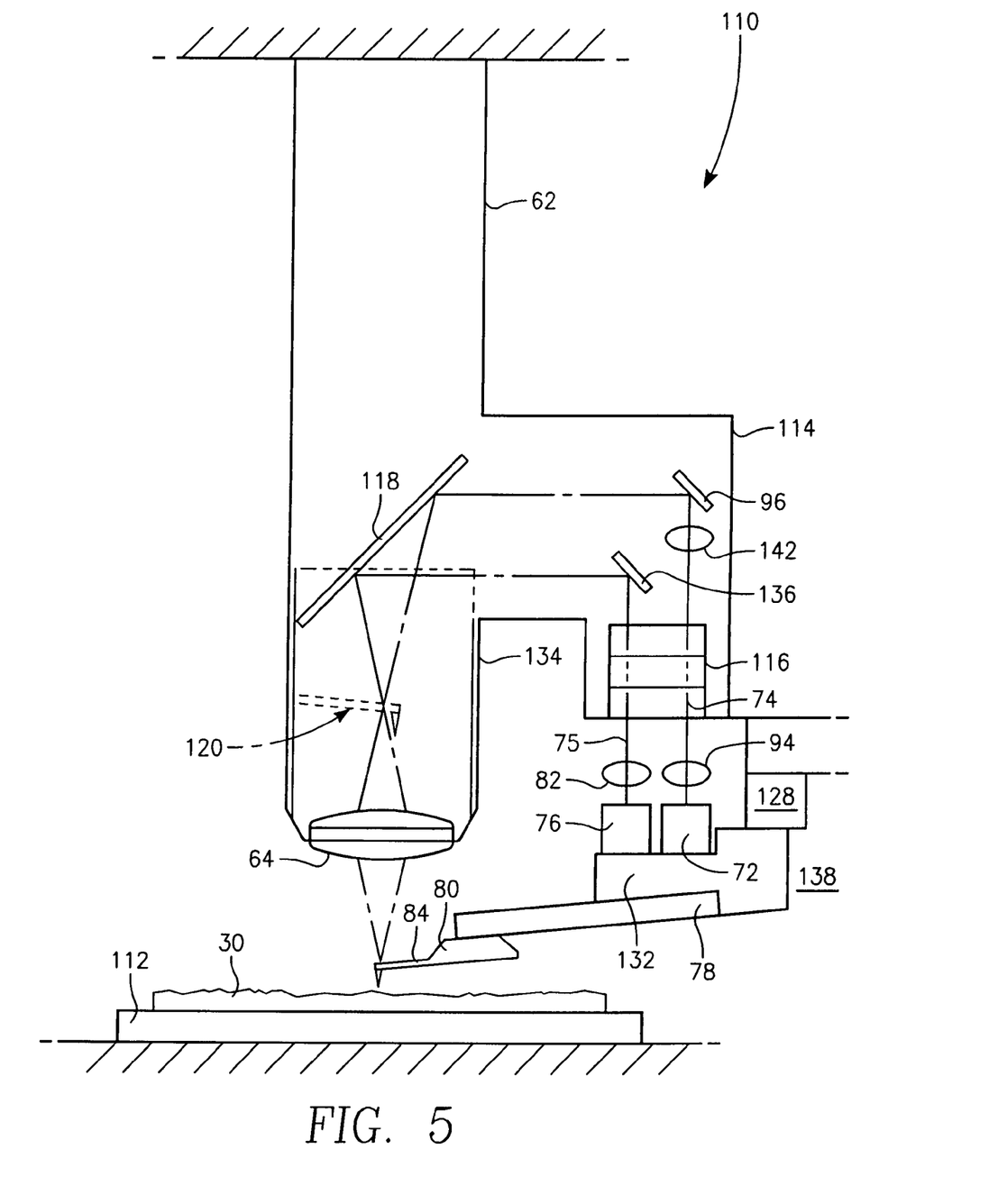
FIG. 5 is a view of a probe microscope integrated into the optical train of a confocal microscope.

FIG. 5 shows an integrated confocal and probe microscope system 110 wherein the optics of the confocal portion of the microscope and the optics of the probe microscope are integrated into a single system. Second alternate probe module 138 includes a light source (typically a laser diode) 72, a frame 132, probe Z motion device 78 and probe assembly 80. Probe module 138 is easily removed and attached to probe microscope X, Y scanning translation device 128. Beam 74 emanates from light source 72 and may be focused by laser lens 94. Beam 74 is then directed toward a prism 116 and then toward a second probe microscope lens 142. Prism 116 is a dove prism and has the properties that images are reversed in one axis but not the other. There are combinations of mirrors and prisms that can create the same effect as dove prism 116 but dove prism 116 is simpler and preferred. In this embodiment of the invention confocal frame 134 and its supported optical elements do not move and are in a fixed frame of reference relative to probe module 138.

After passing through lens 142 beam 74 is reflected from a first mirror 96 and reflected again from a beam splitting mirror 118. Beam splitting mirror 118 is a mirror that partially reflects a specific wavelength band of light and passes other wavelengths relatively un-attenuated. Such beam splitters are commonly referred to as dichroic plate beam splitters. Beam 74 is further brought to focus at a cantilever 84 by confocal microscope objective lens 64. This creates a reflected light beam 75. Reflected light beam 75 passes back through objective lens 64 and then again to beam splitting mirror 118. Beam splitting mirror 118 now reflects reflected beam 75 back to mirror 136 and again back through prism 116. Beam 75 then is directed through detector lens 82 and onto photo-diode array 76. It is important to note that detector lens 82 and detector 76 as well as light source 72, lens 82 and lens 94 are mounted to probe module frame 132 and consequently move with module 138. Computer 50 processes signals from array 76 and sends control signals to SPM Z motion device 78. Computer 50 also computes data from the signals returned from array 76 for display to a computer user or for the use of other computers (not shown) on a network (not shown).

The confocal microscope detector assembly 62 is part of integrated microscope system 110. A fixed confocal microscope frame 114 houses the confocal optical train. Scanning probe X, Y translator 128 is attached to frame 114 and to probe module frame 132 and creates relative motion between frame 114 and probe module 132. Confocal microscope detector assembly 62 may be either of the white light type with apertures (not shown) or of the laser type with separately focused laser (not shown). In both cases objective lens 64 is selected such that it serves the functions of being both the objective for the confocal microscope and the focusing lens for the integrated probe microscope.

In operation translator 128 creates relative motion between microscope frame 114 and probe module frame 132 thus moving scanning probe assembly 80 laterally over sample 30. Lenses 64 and 142 create a virtual image 120 of the moving probe assembly 80 with moving cantilever 84 at a distance "d" from lens 142. This distance must be substantially the same as the distance from objective lens 64 to cantilever 84 in order to maintain the track of real image 120 such that light beam 74 emanating from source 72 follows the motion of real image 120, and consequently the motion of cantilever 84, and such that reflected light beam 75 tracks the motion of detector 76. Also, in operation X, Y translator 128 may be used to shift probe module 138 to one side of the field of view of confocal microscope 62 thus freeing confocal microscope 62 field of view from any vignetting that may be caused by cantilever 84. Illumination of sample surface 30 may accomplished by light sources (not shown) located around the periphery of objective lens 64. This type of illumination is often referred to as "dark field" illumination. Alternately, a light source (not shown) located inside the frame of confocal microscope 62 may be transmitted through objective 64 and in this case is often referred to as "bright field" illumination. A further alternate method of illumination is created when the illumination source (not shown) is directed offset through the objective lens in which case the illumination is referred to as "oblique illumination".

Thus computer 50 now may receive data from both confocal microscope 62 and probe module 138.

Figure 6:
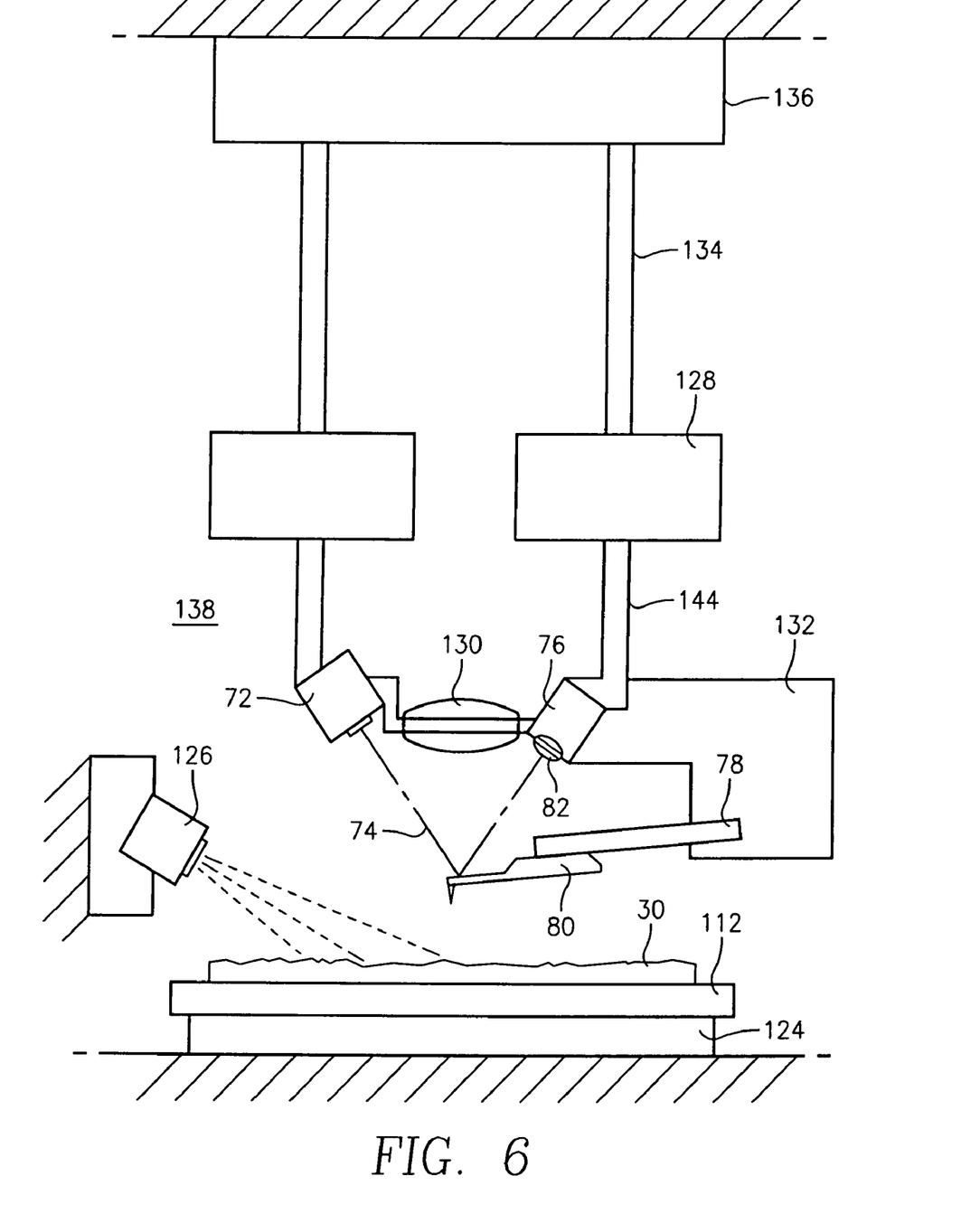
FIG. 6 shows a third embodiment of a removable probe module that is employed in a microscope system where the probe microscope is coaxial with the confocal microscope.

FIG. 6 will now be described. Confocal microscope 136 is attached to a fixed frame of reference as is one side of a coarse Z motion device 124. Confocal microscope frame 134 is connected on one end to confocal microscope 136 with the opposing end attached to an X, Y flexure stage 128. X, Y flexure stage 128 is connected to integrated confocal objective and probe module 138. Module 138 comprises objective lens 130, light source 72, detector 76, and detector lens 82.

Probe frame 132 is connected to module frame 144. Frame 132 supports Z motion device 78. Z motion device 78 supports probe assembly 80. Oblique illumination source 126 is connected to the fixed reference frame illuminates sample 30. Sample 30 is connected to sample stage 112 and sample stage 112 is connected to coarse Z motion device 124.

The operation of the alternate integrated confocal and probe microscope in FIG. 6 will now be described. Confocal microscope 136 operates with lens 130 as a conventional confocal microscope to image sample 30. Flexure 128 creates relative X, Y motion between integrated module 138 and sample 30. Coarse Z motion device 124 brings sample 30 into proximity with probe assembly 80. Integrated module 138 now scans sample 30 in the manner previously described for probe microscopes with detector 76 detecting the changes in the position of light beam 74 as probe assembly 80 moves over sample 30. Oblique source 126 illuminates sample 30 such that image formed by lens 130 is detected by confocal microscope 136 thereby creating a confocal image of sample 30.

The confocal microscope detector assembly 62 is part of integrated microscope system 110. A fixed confocal microscope frame 114 houses the confocal optical train. Scanning probe X, Y translator 128 is attached to frame 114 and to probe module frame 132 and creates relative motion between frame 114 and probe module 132 Confocal microscope detector assembly 62 may be either of the white light type with apertures (not shown) or of the laser type with separately focused laser (not shown). In both cases objective lens 64 is selected such that it serves the functions of being both the objective for the confocal microscope and the focusing lens for the integrated probe microscope.

In operation translator 128 creates relative motion between microscope frame 114 and probe module frame 132 thus moving scanning probe assembly 80 laterally over sample 30. Lenses 64, and 142 create a virtual image 120 of the moving probe assembly 80 with moving cantilever 84 at a distance "d" from lens 142. This distance must be substantially the same as the distance from objective lens 64 to cantilever 84 in order to maintain the track of real image 120 such that light beam 74 emanating from source 72 follows the motion of real image 120, and consequently the motion of cantilever 84, and such that reflected light beam 75 tracks the motion of detector 76. Also, in operation X, Y translator 128 may be used to shift probe module 138 to one side of the field of view of confocal microscope detector assembly 62 thus freeing confocal microscope detector assembly 62 field of view from any vignetting that may be caused by cantilever 84. Illumination of sample surface 30 may accomplished by light sources (not shown) located around the periphery of objective lens 64. This type of illumination is often referred to as "dark field" illumination. Alternately, a light source (not shown) located inside the frame of confocal microscope detector assembly 62 may be transmitted through objective 64 and in this case is often referred to as "bright field" illumination. A further alternate method of illumination is created when the illumination source (not shown) is directed offset through the objective lens in which case the illumination is referred to as "oblique illumination".

In practice, the light source may be a coherent light source such as a laser or a non-coherent light source. The light detector may be a photodiode array, a phototransistor array or a lateral light position sensing device. The translation device may be a piezo driven flexure or a flexure driven by other means such as a magnetic device. The translation devices described for motion in X and Y may be a piezo tube or a piezo bimorph or a piezo stack device. These same devices maybe used for the Z axis actuators described.

The many features and advantages of the invention are apparent from the detailed specification, and thus, it is intended by the appended claims to cover all such features and advantages of the invention, which fall within the true spirit, and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

The discussion included in this patent is intended to serve as a basic description. The reader should be aware that the specific discussion may not explicitly describe all embodiments possible and alternatives are implicit. Also, this discussion may not fully explain the generic nature of the invention and may not explicitly show how each feature or element can actually be representative or equivalent elements. Again, these are implicitly included in this disclosure. Where the invention is described in device-oriented terminology, each element of the device implicitly performs a function. It should also be understood that a variety of changes may be made without departing from the essence of the invention. Such changes are also implicitly included in the description. These changes still fall within the scope of this invention.

Further, each of the various elements of the invention and claims may also be achieved in a variety of manners. This disclosure should be understood to encompass each such variation, be it a variation of any apparatus embodiment, a method embodiment, or even merely a variation of any element of these. Particularly, it should be understood that as the disclosure relates to elements of the invention, the words for each element may be expressed by equivalent apparatus terms even if only the function or result is the same. Such equivalent, broader, or even more generic terms should be considered to be encompassed in the description of each element or action. Such terms can be substituted where desired to make explicit the implicitly broad coverage to which this invention is entitled. It should be understood that all actions may be expressed as a means for taking that action or as an element which causes that action. Similarly, each physical element disclosed should be understood to encompass a disclosure of the action which that physical element facilitates. Such changes and alternative terms are to be understood to be explicitly included in the description.

REFERENCE NUMERALS

10 Combined scanning probe and confocal microscope system
20 Single bridge combined scanning probe and confocal microscope system.
22 Microscope base
24 X, Y stage
26 First bridge
28 Second bridge
30 Sample
32 First Z stage
34 Second Z stage
36 Scanning probe microscope
38 Confocal microscope
40 Probe assembly
41 Probe module
42 Objective lens
44 Probe module cassette
46 Retaining pins
48 New probe module
50 Computer
52 Display driver
54 Empty module station
60 First alternate combination confocal and probe microscope system
62 Confocal microscope detector assembly
64 Confocal objective lens
66 Scanning probe microscope frame
68 Scanning probe microscope X, Y flexure
70 First alternate probe microscope
71 First alternate scanning probe module
72 Light source
74 Light beam
75 Reflected light beam
76 Photo-diode array
78 Scanning probe Z motion device
80 Scanning probe assembly
82 Scanning probe detector lens
84 Cantilever
86 Probe tip
90 Second alternate microscope system
92 Second alternate probe module
94 Probe microscope light source focusing lens
96 First mirror
98 Second mirror
110 Integrated confocal and probe microscope system
112 Sample stage
114 Fixed confocal microscope frame
116 Dove prism
118 First partially reflecting mirror
120 Real image of cantilever
122 Second confocal lens
124 Coarse Z axis motion device
126 Oblique field illumination source
128 X,Y axis motion flexure
130 Objective lens
132 Probe module frame
134 Confocal frame
136 Confocal microscope
138 Integrated confocal objective and probe module
140 Alternate integrated confocal and probe microscope
142 Second probe microscope lens
144 Module frame

What is claimed is:

1. A combination microscope system for observing one or more parameters of a sample comprising:
a confocal microscope further comprising:
a confocal detector assembly for creating a confocal image signal;
a confocal objective lens for creating an image to be processed by said confocal detector assembly;
an X,Y translator that creates relative lateral motion between said confocal microscope and at least one element of a probe microscope, said probe microscope further comprising:
a probe microscope module attached to said X, Y translator wherein said module further comprises
a probe microscope frame positioned near but not touching said confocal objective lens;
a probe assembly;
means for moving said probe assembly wherein the motion of said probe assembly is substantially toward and away from said sample;
a light source that creates an incident light beam directed toward a cantilever, wherein there is at least a partial reflection of said light beam, said partial reflected beam being a reflected beam and said reflected beam being directed onto a photo detector and wherein said cantilever is connected to said probe assembly;
wherein when a tip mounted on said probe assembly senses a parameter of said sample, said cantilever deflects and a parameter of said reflection of said light beam is detected by said photo-detector
whereby said probe microscope module provides surface data of said sample to said probe microscope, and said confocal detector provides signals representative of the optical parameters of said sample to said confocal microscope.

2. A combination microscope system as defined in claim 1 that further comprises
a base;
an X,Y stage attached to said base that carries said sample;
a first bridge attached to said base carrying a first Z axis state that carries said probe microscope; and
a second bridge attached to said base carrying a second Z axis stage that carries said confocal microscope wherein one or more computers send commands to and/or receives data from said confocal microscope and said probe microscope and that processes said data and presents one or more images to one or more users through one or more display devices while said computers generate commands to said first Z axis, said second Z axis and said X, Y stage.

3. The combination microscope system as defined in claim 2 wherein said commands by at least one of said computers in response to said data includes commanding the location of said sample anomalies or features of interest on said sample to be viewed by said probe microscope.

4. The combination microscope system as defined in claim 1 wherein a probe module cassette is attached to said X,Y stage wherein said cassette contains one or more probe modules wherein when said X,Y stage positions said cassette under said probe microscope, said first Z axis stage then lowers said probe microscope to engage one of said probe modules and then said first Z axis stage raises said probe microscope while said X,Y stage moves said sample such that the imaging and scanning sequence may resume with said fresh probe module.

5. The combination microscope system as defined in claim 1 wherein said probe module further comprises optical elements selected from the group consisting of mirrors and prisms where said elements redirect said incident and/or said reflected beams.

6. The microscope system of claim 1 wherein said light source is a laser.

7. The microscope system of claim 1 wherein said detector detects the changing position of said reflected light beam wherein the changing position results from deflections of said cantilever.

8. The microscope system of claim 1 wherein said detected parameter of said reflected light is the resulting interference of said reflected light with said incident beam.

* * * * *